Patented Jan. 14, 1947

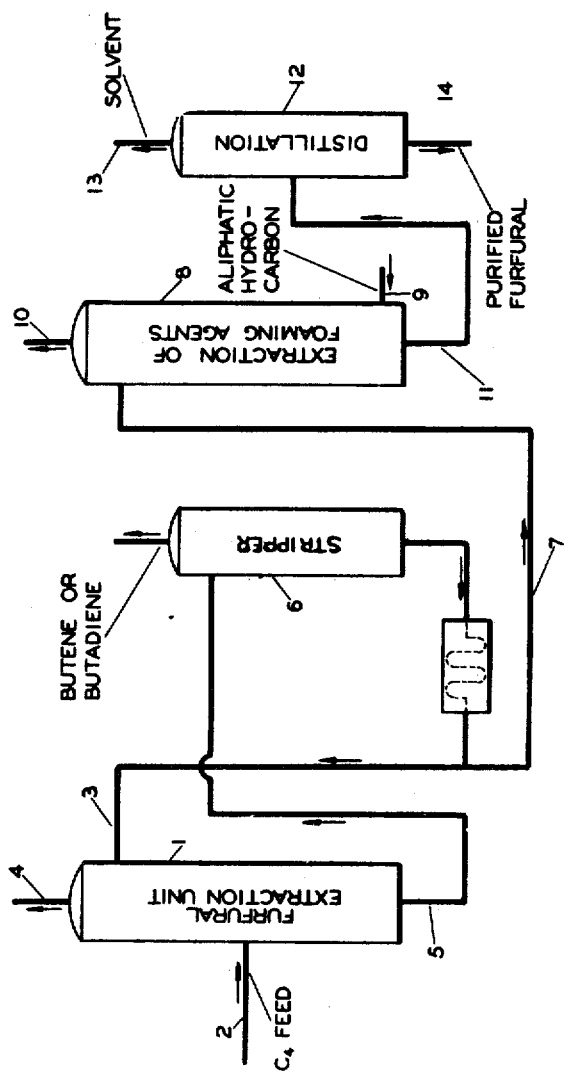

2,414,402

UNITED STATES PATENT OFFICE 2,414,402

REMOVAL OF FOAM-PRODUCING SUBSTANCES FROM FURFURAL EMPLOYED IN EXTRACTIVE DISTILLATION OF HYDROCARBONS

George Thodos and Charles F. Weinaug, Borger, Tex., assignors to Phillips Petroleum Company, a corporation of Delaware Application July 24, 1944, Serial No. 546,371

11 Claims. (Cl. 202—39.5)

This invention relates to purification of furfural and more particularly furfural which has been used in hydrocarbon selective solvent extraction processes, especially in those processes wherein normal butene and/or butadiene are recovered from more saturated $C_4$ hydrocarbons by extractive distillation and thereby contaminated with foam producing impurities.

In the extractive distillation of hydrocarbon streams with furfural as a solvent, and especially in the extractive distillation to recover normal butene and/or butadiene from $C_4$ hydrocarbon streams containing the same in the manner disclosed in the copending applications of K. H. Hachmuth, Serial No. 438,844, filed April 13, 1942, and Serial No. 454,312, filed August 10, 1942, the furfural solvent gradually becomes contaminated with foam producing impurities which are picked up or formed from the hydrocarbon stream being extracted. While the exact nature of these foam producing materials is not known with certainty, they may consist of heavy hydrocarbons, esters and other related compounds. The rerunning of the furfural to remove polymer in accordance with U. S. Patents 2,350,584 and 2,350,609, assigned to the assignee of the present invention, does not effect removal of the foam producing substances. Presumably this is because the foaming oils, impurities and/or oil-furfural azeotropes (if such azeotropes are formed) boil below or substantially at the boiling point of pure furfural or furfural containing the limited amount of water commonly employed. When the concentration of the foam producing substances exceeds certain limits the furfural foams excessively in the extractive distillation and solvent stripping steps. This results in inefficient extraction and carryover of solvent into the hydrocarbon overhead products of these steps.

The principal object of the present invention is to provide a method of removing these foam producing impurities in a simple and economically feasible manner. Another object is to accomplish the removal with a minimum of equipment and additional processing steps. Another object is to accomplish this removal while maintaining the furfural in a form satisfactory for reuse in the extractive distillation system. Numerous other objects will more fully hereinafter appear.

The accompanying drawing portrays diagrammatically one arrangement of equipment which has been found satisfactory in carrying out the present invention.

In accordance with our invention the furfural which is contaminated with foam producing substances is subjected to liquid-liquid extraction with a hydrocarbon which is immiscible with the furfural. In this way solution of the foam producing substances in the hydrocarbon is effected, it having been found that the foam producing substances are soluble in the hydrocarbon in preference to the furfural. Upon separation of the resulting hydrocarbon phase containing the dissolved foam producing substances from the resulting furfural phase there is obtained furfural sufficiently free from foam producing materials to be usable in the extractive distillation process. The purification process may be operated continuously or intermittently. In some cases it is sufficient to operate the purification unit for a period of time just long enough to reduce the content of the foam producing substances in the furfural in the system to a satisfactorily low level whereupon the operation of the purification unit may be discontinued until such time as the foam producing oils or other substances have attained a predetermined concentration in the furfural in the system.

By "hydrocarbon immiscible with furfural" we mean any hydrocarbon which is not miscible in all proportions with furfural whether the furfural be anhydrous or contain the usual small amount of dissolved water.

The preferred hydrocarbon is an aliphatic hydrocarbon having from 3 to 8 carbon atoms per molecule, and of the aliphatic hydrocarbons the paraffins ranging from propane through octanes are especially satisfactory. Any of the iso and normal paraffins ranging from propane to octane are operative. We have successfully employed propane, normal butane, normal pentane, isopentane and normal hexane. It is not necessary that the hydrocarbon be entirely paraffinic. We have obtained very satisfactory results with a $C_4$ stream consisting essentially of normal butane and normal butenes. The paraffins are more effective solvents for the foam producing substances than the olefins and since they are must less miscible with furfural than the olefins, their use is preferred.

In proceeding in accordance with our invention we may treat all or a portion of the furfural with the aliphatic hydrocarbon to effect extraction of the foam producing components. Often it is satisfactory to continuously treat a small stream of the furfural with the aliphatic hydrocarbon thereby continuously maintaining the level of foam producing constituents in the furfural in the extractive distillation system at a predetermined low value.

The aliphatic hydrocarbon employed as extractant is added in excess of its solubility in the contaminated furfural so that two separate phases exist. Contacting of the contaminated furfural and the aliphatic hydrocarbon can be brought about in any suitable manner as by countercurrent liquid-liquid extraction, batch agitation, jet mixing, etc. Upon settling, a hydrocarbon-rich and a furfural-rich phase are obtained. The hydrocarbon-rich phase contains most of the foam producing substances. Repeated extractions will render the furfural practically free of them.

Various ratios of the aliphatic hydrocarbon extractive solvent to the contaminated furfural have been tried. It has been found that the extent of contaminant removal is essentially independent of the ratio of aliphatic hydrocarbon to furfural (increasing only slightly with an increase of the aliphatic hydrocarbon-furfural ratio) for any given hydrocarbon once the hydrocarbon solubility in the furfural has been exceeded.

After a solvent extraction treatment of contaminated furfural in accordance with the present invention the foaming tendency of the furfural-rich layer was found to be considerably less than that of untreated contaminated furfural. Further improvement was noted when the solvent dissolved by the furfural was removed from the furfural-rich layer by distillation.

The invention is equally applicable to extractive distillation systems employing anhydrous furfural and to those wherein furfural containing the usual small percentages of water is employed.

Of the hydrocarbons tried, normal hexane proved most effective in the removal of foam producing contaminants and indications are that this behavior becomes more pronounced with increasing molecular weight of the hydrocarbons. However, in view of the fact that streams of normal butane or mixed normal butane and normal butenes are commonly available in the plants where normal butene and/or butadiene are extracted from $C_4$ streams containing the same, it is often preferable to use such available $C_4$ streams for carrying out the extraction of the foam producing oils or other materials.

In the accompanying drawing the extractive distillation system wherein the furfural is used is illustrated for the sake of completeness. The $C_4$ hydrocarbon feed containing butene and/or butadiene to be extracted enters the furfural absorber or extractive distillation column 1 via line 2, the furfural being introduced at the top via line 3. The undissolved compounds of the feed leave via line 4. The furfural rich in butene and/or butadiene is drawn off the bottom of column 1 via line 5 and fed into stripper 6 where the dissolved hydrocarbon is stripped out in the usual way. The stripped furfural is cooled and in part returned via line 3 to the top of column 1. A portion is passed via line 7 to the foaming agent removal unit of the present invention. The contaminated furfural is fed into the top of a liquid-liquid extraction column 8, the aliphatic hydrocarbon solvent being fed in at the bottom via line 9. The aliphatic hydrocarbon containing the foam producing substances and some furfural leaves the top via line 10 while the furfural-rich phase containing some solvent leaves the bottom via line 11. Where the solvent is the same as a paraffin contained in the feed entering via line 2, the furfural may be recycled directly from line 11 to the extractive distillation system. For example, where the solvent is normal butane, and the feed entering via line 2 is a mixed $C_4$ hydrocarbon feed containing normal butane, the presence of small amounts of dissolved solvent in the furfural will not be objectionable. Usually however it is preferred that the furfural reintroduced to the extractive distillation system be as low in hydrocarbon as possible to prevent the breaking out of a separate hydrocarbon phase in the extractive distillation column 1 which may cause flooding of the column with consequent ineffectiveness. Accordingly, it has been found preferable to pass the furfural in line 11 to distillation unit 12 where the dissolved solvent is separated as an overhead (together with some water where the furfural contains water) via line 13 from a bottoms product of the purified furfural leaving via line 14. The purified furfural is recycled to the extraction column 1.

The hydrocarbon-rich phase leaving extraction unit 8 via line 10 may be treated by any suitable means (not shown) for recovery of the small amount of furfural retained in solution or entrained therein. Likewise the overhead product from the distillation of the furfural-rich phase in column 12 may be treated by suitable means (not shown) for the recovery of furfural that might be taken overhead especially when the furfural contains a small percentage of water.

*Example*

Furfural, containing about 4 weight per cent water, from a butadiene and/or butene extractive distillation process was treated with normal pentane by countercurrent liquid-liquid contact for the removal of foam producing substances. The temperature maintained during the countercurrent contacting was about 80° F. The ratio between normal pentane and the furfural-water mixture was maintained from about 1 to 9 minimum to 1 to 6 maximum. The main requirement to be observed is to exceed the solubility of the normal pentane in the furfural-water mixture at the temperature maintained in the contacting system thus giving rise to two distinct liquid phases. The furfural-rich phase relatively free of foam producing substances was then fractionated to remove dissolved normal pentane. The furfural from this fractionation was then returned to the previously mentioned butadiene and/or butene extraction unit. Operation of the extraction unit was appreciably improved whenever a sufficiently large enough portion of the furfural was treated in the above described manner to keep the amount of foam producing substances in the total stream at a low level. Were the furfural not so treated the concentration of the foam forming substances would finally increase to such a level that the furfural extractive distillation tower and stripper would prime and carry furfural overhead with the hydrocarbon streams. The efficiency of the extraction would thus be greatly impaired.

From the foregoing, it will be seen that the present invention provides a simple and economical method of keeping the foam producing substances at a desirably low level so that foaming is prevented and the efficiency of the extractive distillation is maintained. Many other advantages of the purification process of the present invention will be apparent to those skilled in the art.

It will be understood that the extraction is conducted at such a pressure that the extractant hydrocarbon is maintained in liquid phase. Special precautions to insure this are necessary where a normally gaseous hydrocarbon such as propane, normal butane or isobutane is used or where the extraction is conducted at such a temperature that the hydrocarbon solvent would otherwise be volatilized.

The temperature of extraction should be sufficiently high that the mixture is adequately mobile and should be such that the furfural and the hydrocarbon solvent are immiscible.

The terms "butene" and "normal butene" as used in this specification and in the claims appended hereto denote either a single butene or mixtures of any of the butenes. For example the term "normal butene" designates butene-1, low-boiling butene-2, or high-boiling butene-2 as well as any mixture of two or more of such normal butenes.

We claim:

1. The process of purifying furfural which is contaminated with foam-producing substances normally contained in mixtures of low boiling aliphatic hydrocarbons and which have been extracted therefrom together with unsaturated hydrocarbons by said furfural which comprises subjecting said contaminated furfural to liquid-liquid extraction with an aliphatic hydrocarbon immiscible with furfural and thereby effecting solution of said foam-producing substances in said hydrocarbon, and separating the resulting hydrocarbon phase containing the dissolved foam-producing substances from the resulting furfural phase.

2. The process of purifying furfural which is contaminated with foam-producing substances normally contained in mixtures of low boiling aliphatic hydrocarbons and which have been extracted therefrom together with unsaturated hydrocarbons by said furfural which comprises subjecting said contaminated furfural to liquid-liquid extraction with an aliphatic hydrocarbon having from 3 to 8 carbon atoms per molecule which is immiscible with furfural and thereby effecting solution of said foam-producing substances in said hydrocarbon, and separating the resulting hydrocarbon phase containing the dissolved foam-producing substances from the resulting furfural phase.

3. The process of purifying furfural which is contaminated with foam-producing substances normally contained in mixtures of low boiling aliphatic hydrocarbons and which have been extracted therefrom together with unsaturated hydrocarbons by said furfural which comprises subjecting said contaminated furfural to liquid-liquid extraction with a $C_3$ to $C_8$ paraffin-hydrocarbon and thereby effecting solution of said foam-producing substances in said hydrocarbon, and separating the resulting paraffin hydrocarbon phase containing the dissolved foam-producing substances from the resulting furfural phase.

4. The process of purifying furfural which is contaminated with foam-producing substances normally contained in mixtures of low boiling aliphatic hydrocarbons and which have been extracted therefrom together with unsaturated hydrocarbons by said furfural which comprises subjecting said contaminated furfural to liquid-liquid extraction with hexane and thereby effecting solution of said foam-producing substances in said hexane, and separating the resulting hexane phase containing the dissolved foam-producing substances from the resulting furfural phase.

5. The process of purifying furfural which is contaminated with foam-producing substances normally contained in mixtures of low boiling aliphatic hydrocarbons and which have been extracted therefrom together with unsaturated hydrocarbons by said furfural which comprises subjecting said contaminated furfural to liquid-liquid extraction with pentane and thereby effecting solution of said foam-producing substances in said pentane, and separating the resulting pentane phase containing the dissolved foam-producing substances from the resulting furfural phase.

6. The process of purifying furfural which is contaminated with foam-producing substances normally contained in mixtures of low boiling aliphatic hydrocarbons and which have been extracted therefrom together with unsaturated hydrocarbons by said furfural which comprises subjecting said contaminated furfural to liquid-liquid extraction with butane and thereby effecting solution of said foam-producing substances in said butane, and separating the resulting butane phase containing the dissolved foam-producing substances from the resulting furfural phase.

7. The process of purifying furfural which is contaminated with foam-producing substances normally contained in mixtures of low boiling aliphatic hydrocarbons and which have been extracted therefrom together with unsaturated hydrocarbons by said furfural which comprises subjecting said contaminated furfural to liquid-liquid extraction with an aliphatic hydrocarbon having from 3 to 8 carbon atoms per molecule and which is immiscible with furfural and thereby effecting solution of said foam-producing substances in said hydrocarbon, separating the resulting hydrocarbon phase containing the dissolved foam-producing substances from the resulting furfural phase, and distilling the furfural phase to remove the hydrocarbon dissolved therein.

8. In an extractive distillation of low-boiling aliphatic unsaturated hydrocarbons with furfural as the selective solvent, in which the furfural becomes contaminated with foam-producing impurities, the improvement which comprises withdrawing furfural so contaminated from the extractive distillation system, subjecting the furfural so withdrawn to liquid-liquid extraction with a $C_3$ to $C_8$ paraffin and thereby effecting solution of the foam-producing impurities in said paraffin, separating the resulting paraffin phase from the purified furfural phase, and recycling the furfural phase so purified to the extractive distillation system.

9. In the extractive distillation of low-boiling aliphatic unsaturated hydrocarbons with furfural as the selective solvent, in which the furfural becomes contaminated with foam-producing impurities, the improvement which comprises withdrawing furfural so contaminated from the extractive distillation system, subjecting the furfural so withdrawn to liquid-liquid extraction with a $C_3$ to $C_8$ paraffin and thereby effecting solution of the foam-producing impurities in said paraffin, separating the resulting paraffin phase from the purified furfural phase, distilling the furfural phase to remove dissolved paraffin, and recycling the furfural phase so purified to the extractive distillation system.

10. In the extractive distillation of normal butane and butadiene from less unsaturated aliphatic $C_4$ hydrocarbons with furfural as the selective solvent, in which the furfural becomes contaminated with foam-producing impurities, the improvement which comprises withdrawing furfural so contaminated from the extractive distillation system, subjecting the furfural so withdrawn to liquid-liquid extraction with a $C_3$ to $C_8$ paraffin and thereby effecting solution of the foam-producing impurities in said paraffin, separating the resulting paraffin phase from the purified furfural phase, and recycling the furfural phase so purified to the extractive distillation system.

11. In the extractive distillation of low-boiling aliphatic unsaturated hydrocarbons with furfural as the selective solvent, in which the furfural becomes contaminated with foam-producing impurities, the improvement which comprises withdrawing furfural so contaminated from the extractive distillation system, subjecting the furfural so withdrawn to liquid-liquid extraction with an aliphatic hydrocarbon having from 3 to 8 carbon atoms per molecule and which is immiscible with furfural and thereby effecting solution of the foam-producing impurities in said hydrocarbon, separating the resulting hydrocarbon phase from the purified furfural phase, and recycling the furfural phase so purified to the extractive distillation system.

GEORGE THODOS.
CHARLES F. WEINAUG.

Certificate of Correction

Patent No. 2,414,402. January 14, 1947.

GEORGE THODOS ET AL.

It is hereby certified that error appears in the printed specification of the above numbered patent requiring correction as follows: Column 6, line 75 and column 7, line 1, claim 10, for "butane" read *butene*; and that the said Letters Patent should be read with this correction therein that the same may conform to the record of the case in the Patent Office.

Signed and sealed this 1st day of April, A. D. 1947.

[SEAL]

LESLIE FRAZER,
*First Assistant Commissioner of Patents.* tane and butadiene from less unsaturated aliphatic C₄ hydrocarbons with furfural as the selective solvent, in which the furfural becomes contaminated with foam-producing impurities, the improvement which comprises withdrawing furfural so contaminated from the extractive distillation system, subjecting the furfural so withdrawn to liquid-liquid extraction with a C₃ to C₈ paraffin and thereby effecting solution of the foam-producing impurities in said paraffin, separating the resulting paraffin phase from the purified furfural phase, and recycling the furfural phase so purified to the extractive distillation system.

11. In the extractive distillation of low-boiling aliphatic unsaturated hydrocarbons with furfural as the selective solvent, in which the furfural becomes contaminated with foam-producing impurities, the improvement which comprises withdrawing furfural so contaminated from the extractive distillation system, subjecting the furfural so withdrawn to liquid-liquid extraction with an aliphatic hydrocarbon having from 3 to 8 carbon atoms per molecule and which is immiscible with furfural and thereby effecting solution of the foam-producing impurities in said hydrocarbon, separating the resulting hydrocarbon phase from the purified furfural phase, and recycling the furfural phase so purified to the extractive distillation system.

GEORGE THODOS.
CHARLES F. WEINAUG.

Certificate of Correction

Patent No. 2,414,402. January 14, 1947.

GEORGE THODOS ET AL.

It is hereby certified that error appears in the printed specification of the above numbered patent requiring correction as follows: Column 6, line 75 and column 7, line 1, claim 10, for "butane" read *butene*; and that the said Letters Patent should be read with this correction therein that the same may conform to the record of the case in the Patent Office.

Signed and sealed this 1st day of April, A. D. 1947.

[SEAL]

LESLIE FRAZER,
*First Assistant Commissioner of Patents.*